Feb. 11, 1941. A. MARCHEV ET AL 2,231,274
DUPLICATING APPARATUS
Filed June 3, 1938 10 Sheets-Sheet 1

Inventors:
Alfred Marchev,
Robert F. Morrison,
Morris P. Neal
By Zabel, Carlson, Fitzhugh & Wells,
Attorneys Feb. 11, 1941.　　A. MARCHEV ET AL　　2,231,274
DUPLICATING APPARATUS
Filed June 3, 1938　　10 Sheets-Sheet 2
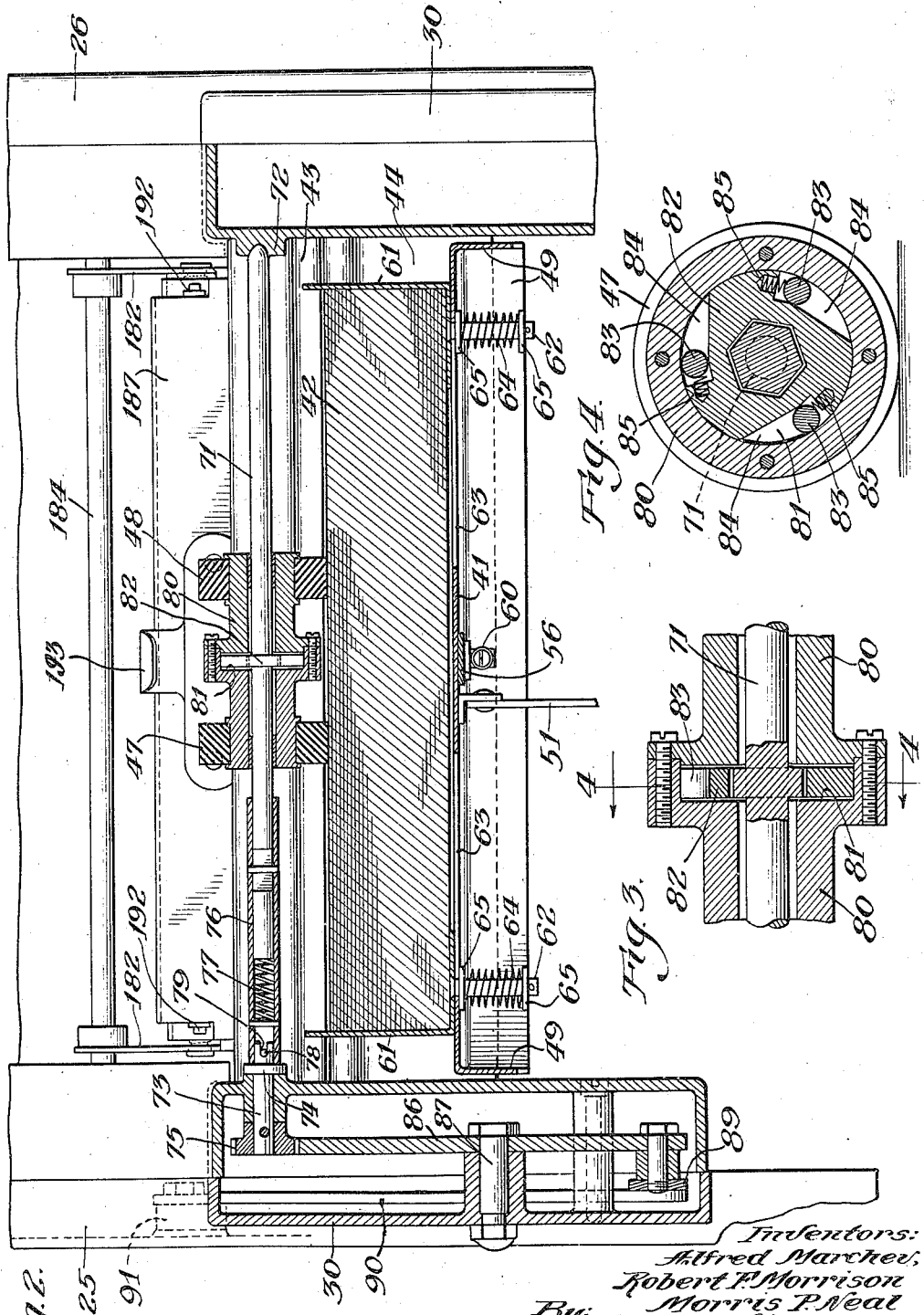

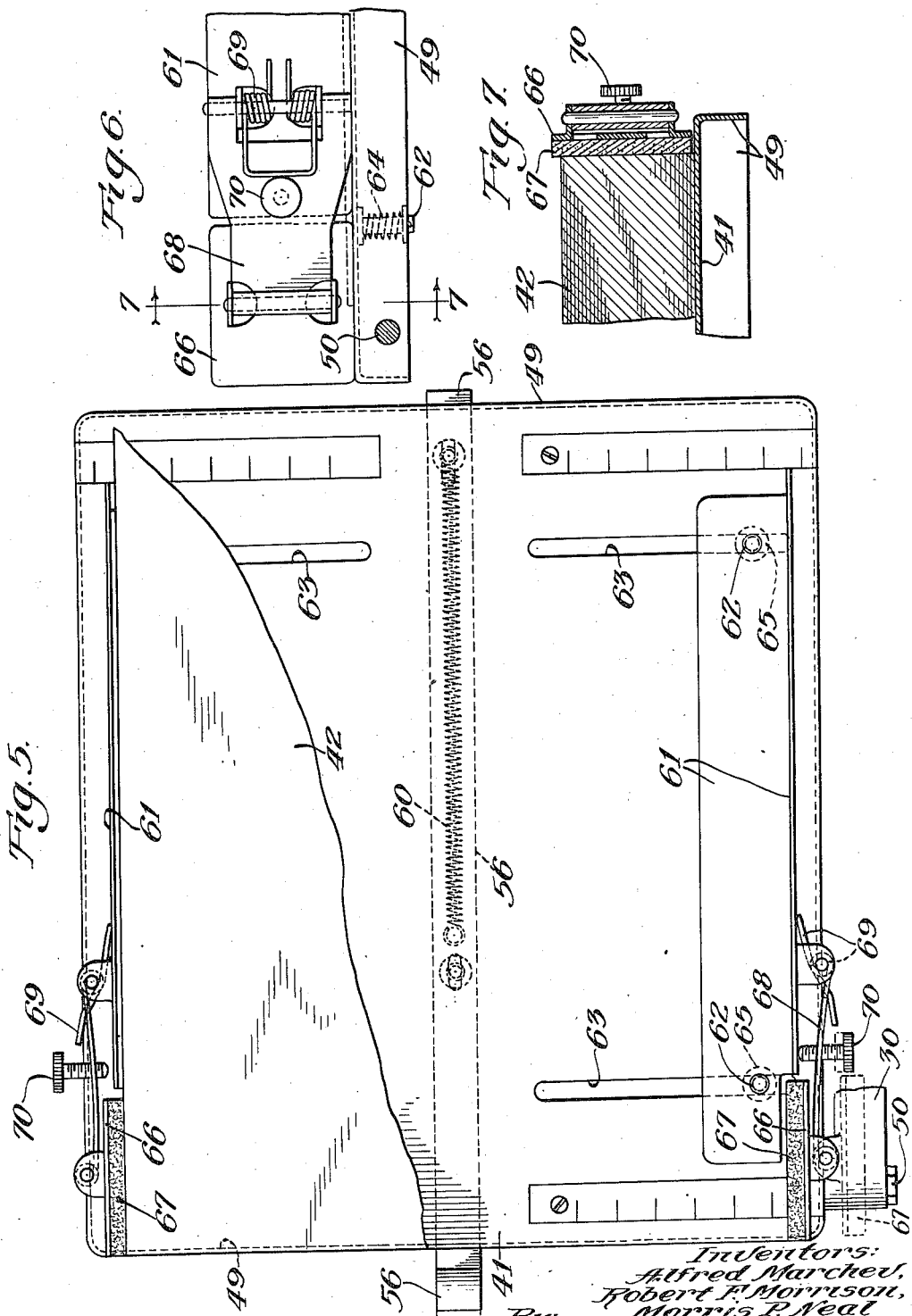

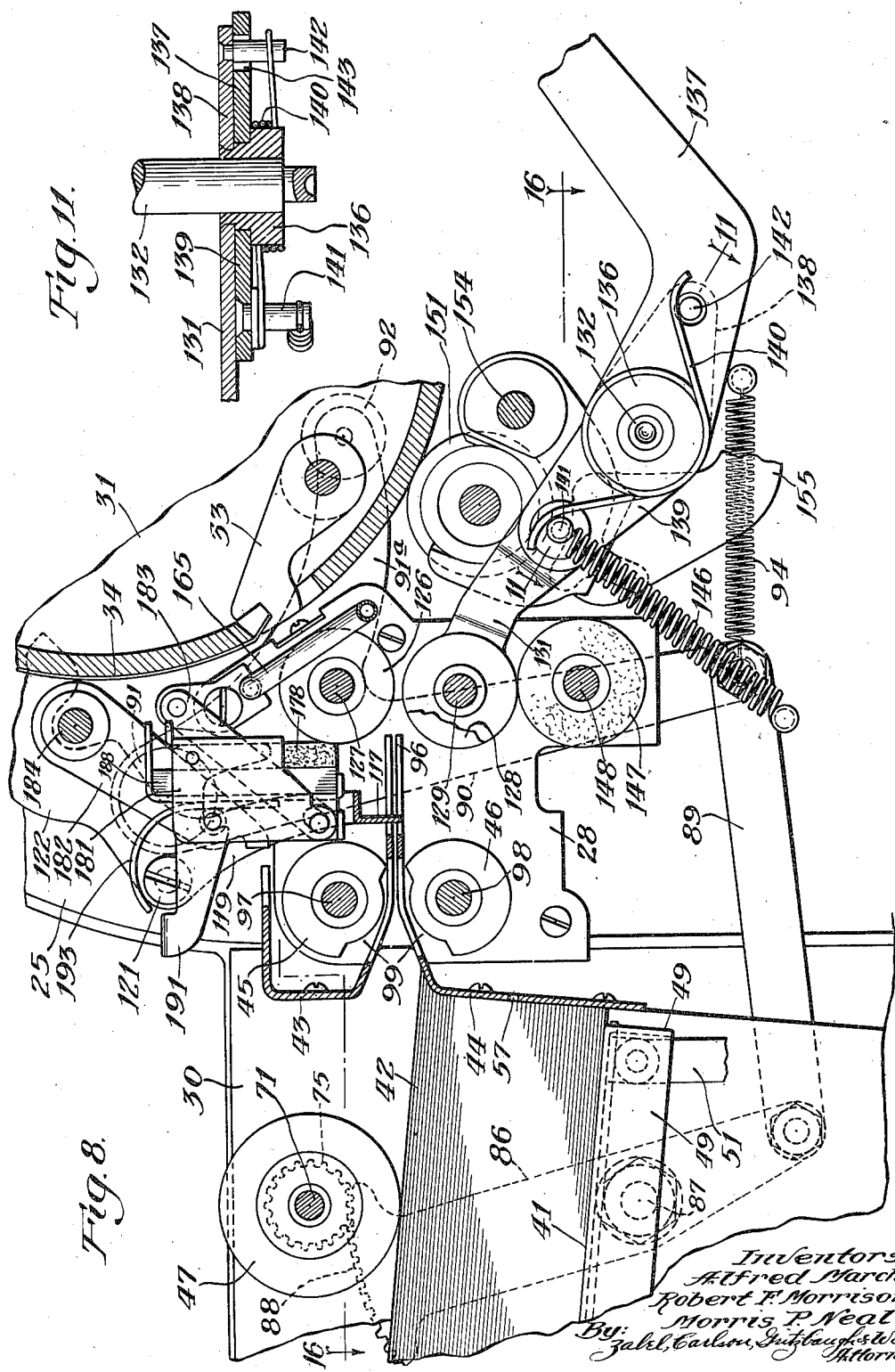

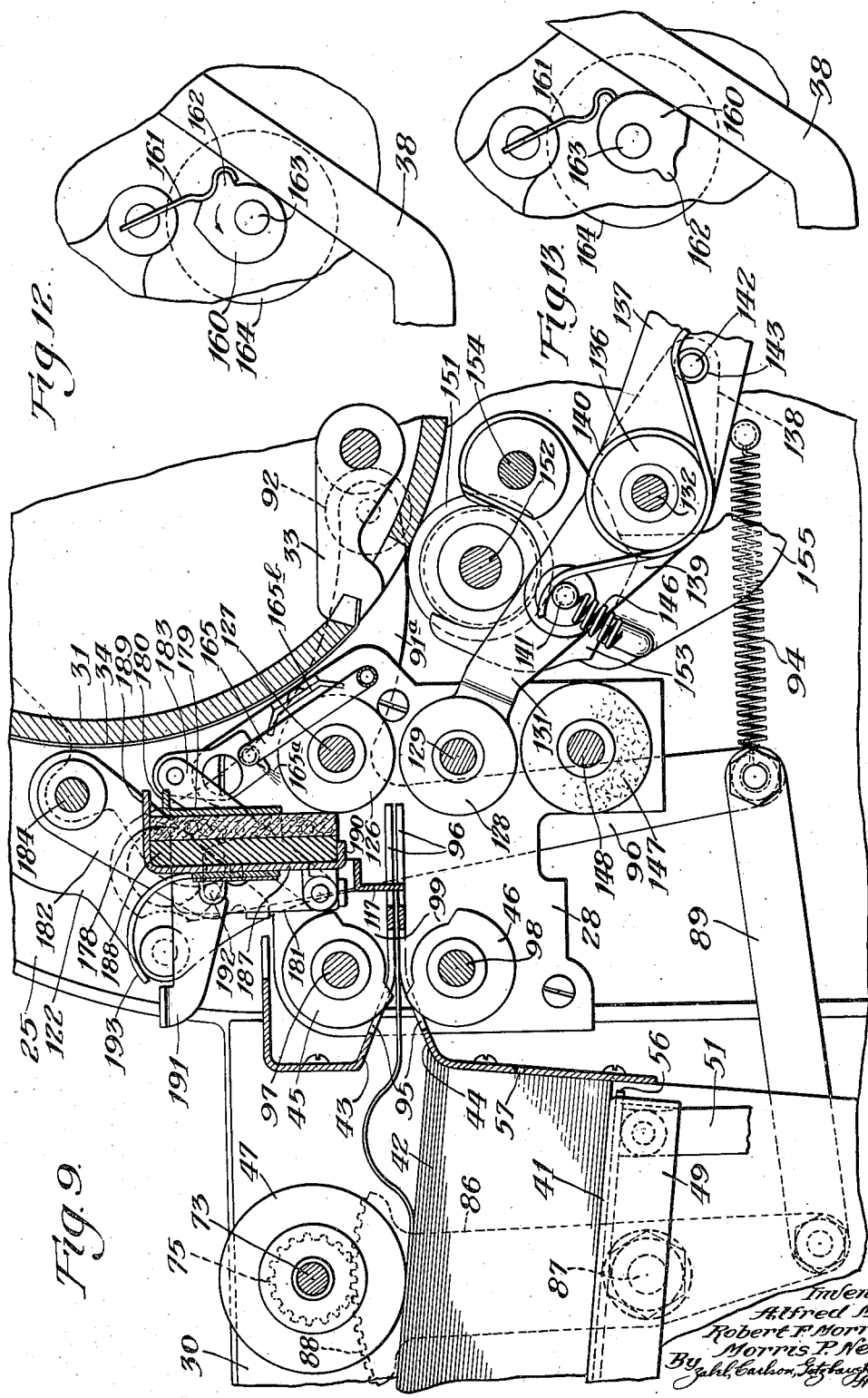

Feb. 11, 1941.  A. MARCHEV ET AL  2,231,274
DUPLICATING APPARATUS
Filed June 3, 1938  10 Sheets-Sheet 6

Inventors.
Alfred Marchev,
Robert F. Morrison,
Morris P. Neal
By:
Zabel, Carlson, Fitzhugh & Will
Attorneys.

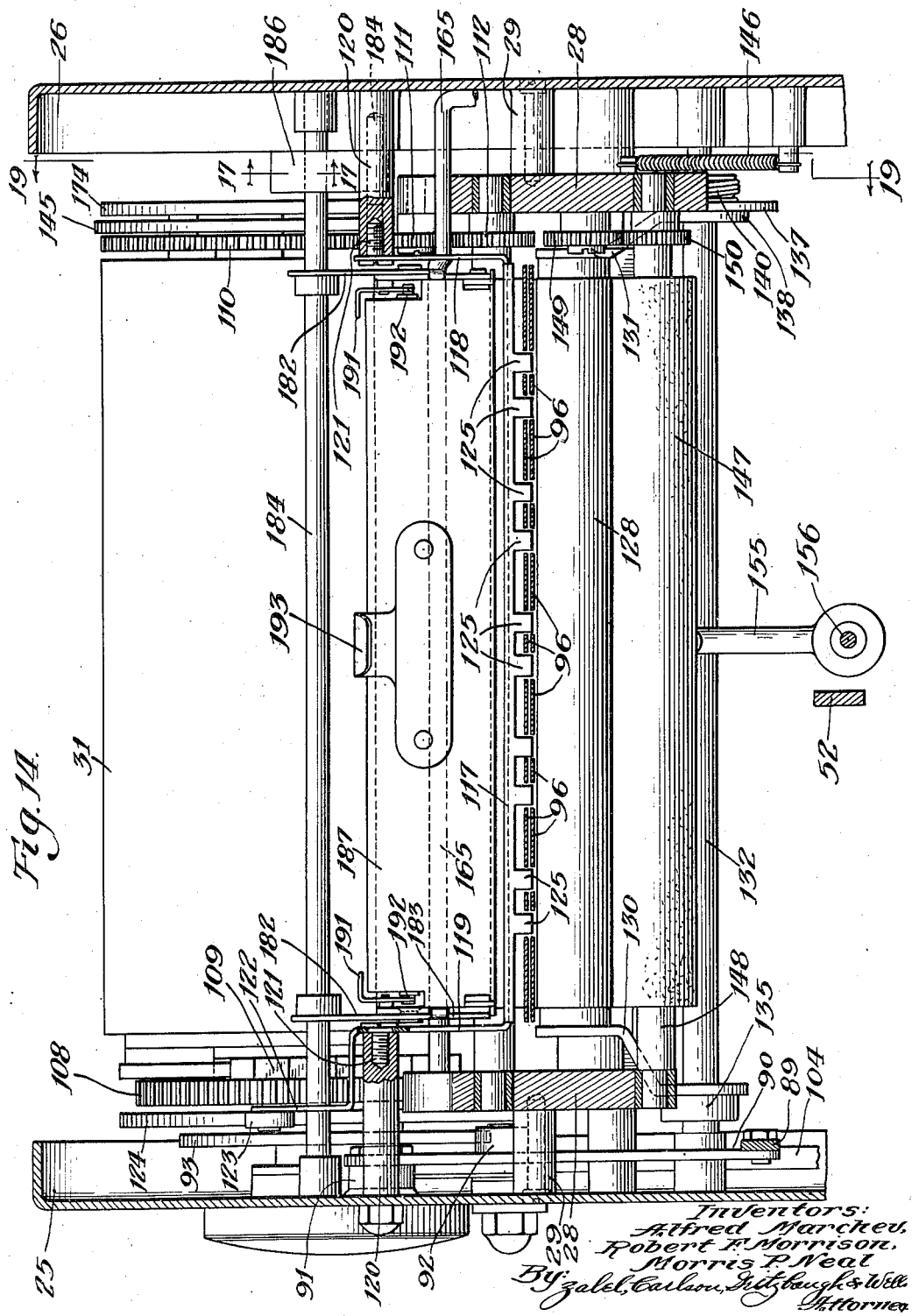

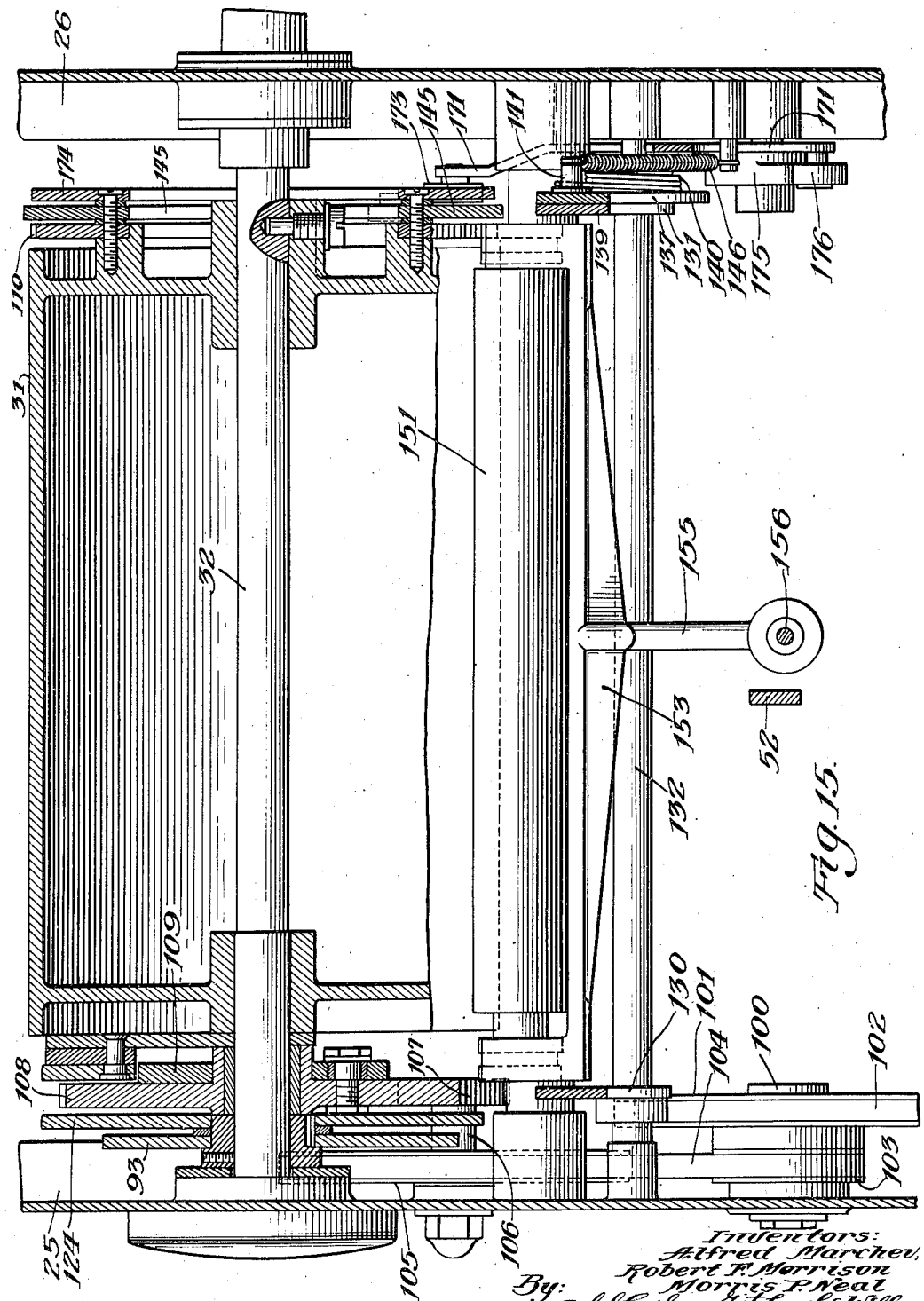

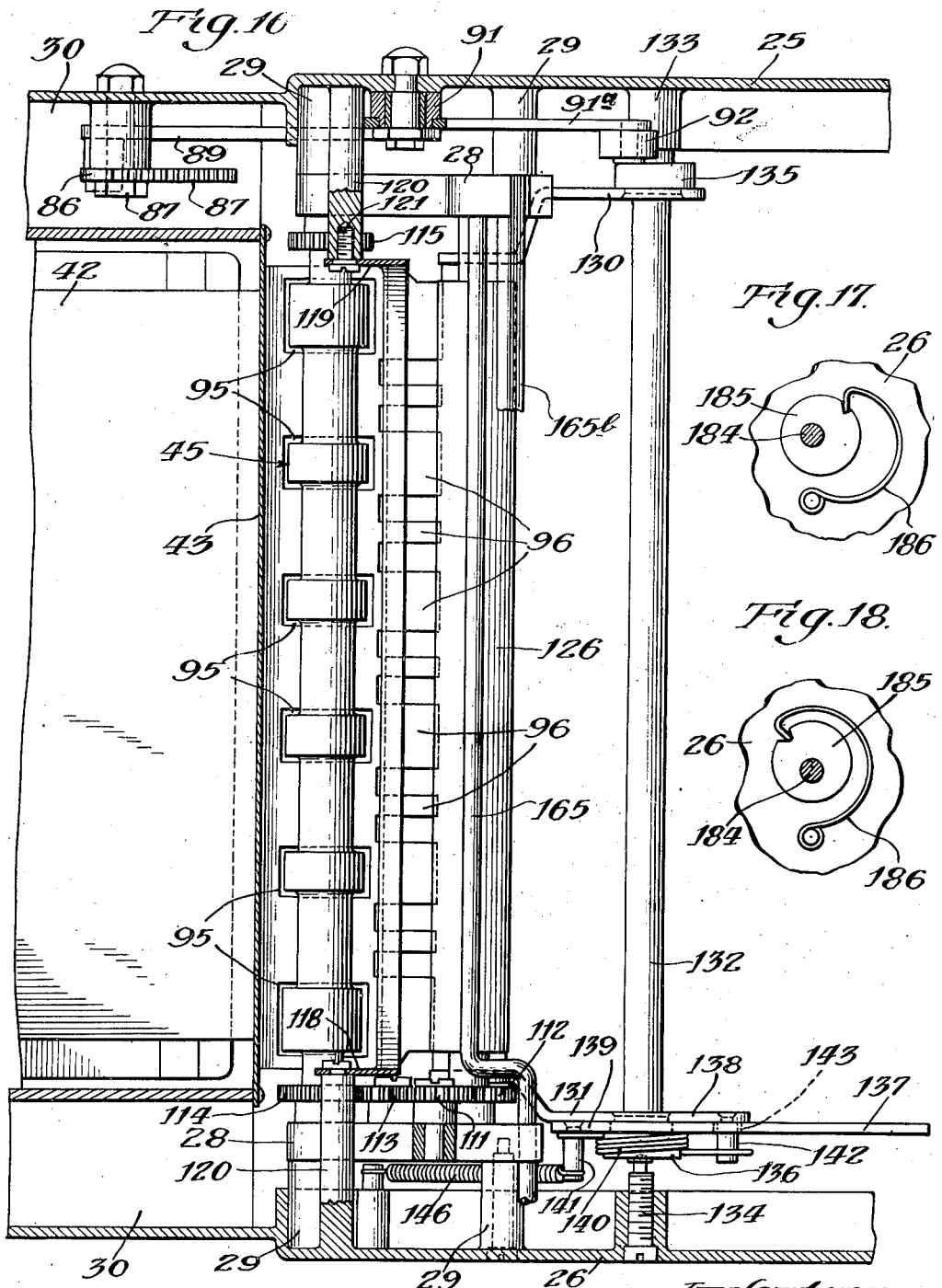

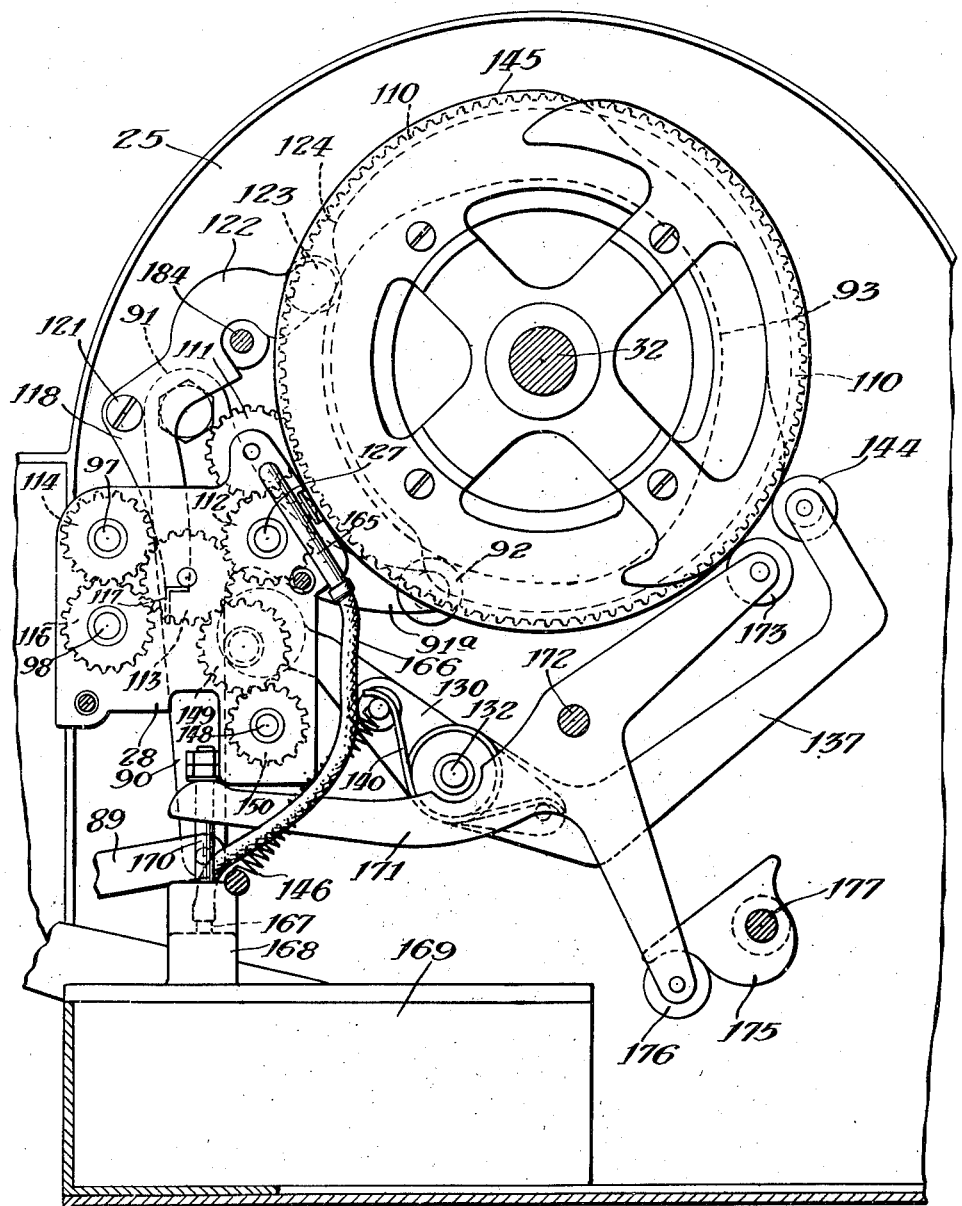

Patented Feb. 11, 1941

2,231,274

UNITED STATES PATENT OFFICE 2,231,274

DUPLICATING APPARATUS

Alfred Marchev, La Grange, Robert F. Morrison, Oak Park, and Morris P. Neal, Villa Park, Ill., assignors to Ditto, Incorporated, Chicago, Ill., a corporation of West Virginia Application June 3, 1938, Serial No. 211,518

33 Claims. (Cl. 101—132.5)

Our invention relates to duplicating apparatus of the so-called wet-process type in which the design to be duplicated is prepared in reverse on the face of a master sheet by the use of soluble ink from a carbon paper or otherwise, the copy sheet to which the design is to be transferred being moistened with a thin film of solvent just prior to its being brought into engagement with the master sheet, so as to soften the ink sufficiently for causing a slight fractional part of the ink to adhere to the copy sheet. It is the object of our invention to provide an apparatus of this type of improved construction with respect to the support of the copy sheets and the delivery of the sheets to the drum by which the master sheet is carried, whereby the sheets may be fed one at a time in the proper timed relation and in normal adjusted position with respect to the position of the master sheet without slowing down or stopping the rotary movement of the drum, automatically-acting means preferably being provided, adapted to be put into use if desired, for stopping the rotation of the drum at the end of each complete revolution thereof, together with manually operable means for restarting the drum after each stop.

For effecting an improved feed of copy sheets to the drum, we have provided a table adjacent to the drum pivotally mounted on a horizontal axis at its outer edge, with a spring or other equivalent means arranged for pressing the table upwardly about its axis so as to keep the top face of a pile of copy sheets supported by the table in normal operative engagement with a feed roller which is driven intermittently at timed intervals for urging the top sheet forward. For cooperation with the table and the feed roll, we have provided pressure plates at opposite sides of the pile of copy sheets on the table adapted to press yieldingly against the side faces of the pile for keeping the sheets even and for applying a limited frictional grip on the edges of the sheets.

For stopping the forward movement of a copy sheet in proper position and for advancing the sheet from the point to which it is fed by the feed roller located above the table, we have provided a novel arrangement of driven rollers which are mutilated circumferentially so as to be operative during only a portion of the time for advancing a sheet, with a stop device located a short distance ahead of said rollers and arranged to be moved into operative position to prevent the forward movement of a sheet, and with a second pair of feed rollers located a short distance ahead of the stop device and effectively driven when in cooperative pressure position with respect to each other for urging a sheet forward and applying a film of solvent upon the face of the sheet, said last-named two feed rollers being kept in cooperative pressure relationship to each other during the entire time when a sheet is passing between the rollers.

In our arrangement as shown, one of said last-named two feed rollers is vibrated at timed intervals out of engagement with the cooperative feed roller so as to be brought into contact with a felt roller which serves to remove any excess solvent. In our preferred arrangement, the intermediate vibrating roller runs idly while the other two rollers which are rotatable on fixed axes are driven so as to rotate in opposite directions with the result that the direction of rotation of said intermediate roller is changed twice for each complete cycle of operation of the parts, as said intermediate roller is brought alternately into engagement with said other rollers.

Our apparatus comprises also an improved arrangement of means for applying solvent to the face of a copy sheet on the way to the drum, including means for pressing an absorbent pad against the face of a roller to which the solvent is applied, such pressing means being so arranged as to enable it to be moved backwardly away from the roller and opened up so as to provide ready access to the pad for adjusting or replacing the pad as may be required. Our arrangement also includes an improved form of spring means for holding the pad and its cooperating parts in either their raised inoperative position or their lowered operative position, such spring means being preferably arranged for passing centers in the movement of the pad from one position to the other so as to be effective in either position with a minimum of attention on the part of the operator.

It is another object of our invention to improve devices of this type in sundry details hereinafter pointed out. The preferred means by which we have accomplished our several objects are illustrated in the accompanying drawings and are hereinafter specifically described.

In the drawings—

Fig. 2 is a vertical lateral cross-sectional view through the copy sheet supporting and forwarding means, being substantially a section taken at line 2—2 of Fig. 1.

Fig. 3 is an enlarged detailed view showing a fragmentary portion of the parts illustrated in Fig. 2.

Fig. 4 is a vertical cross-sectional view taken at the line 4—4 of Fig. 3.

Fig. 5 is a top plan view of the table upon which the copy sheets are piled for delivery to the drum.

Fig. 6 is a side face view of the rear end portion of the table shown in Fig. 5, showing the arrangement of pressure plates adapted to bear against the side edge faces of the pile of sheets on the table.

Fig. 7 is a vertical cross-sectional view taken at the line 7—7 of Fig. 6.

Fig. 8 is a view showing on an enlarged scale a portion of the mechanism shown in Fig. 1, with certain supporting and operating parts added.

Fig. 9 is a view of substantially the same parts as are shown in Fig. 8, but with the parts in changed position and with additional parts shown in cross-section.

Fig. 11 is a cross-sectional view taken at line 11—11 of Fig. 8.

Fig. 12 is an enlarged view of a fragmentary portion of the mechanism as shown in Fig. 1.

Fig. 13 is a view similar to Fig. 12 but showing a changed position of the parts.

Figure 1:
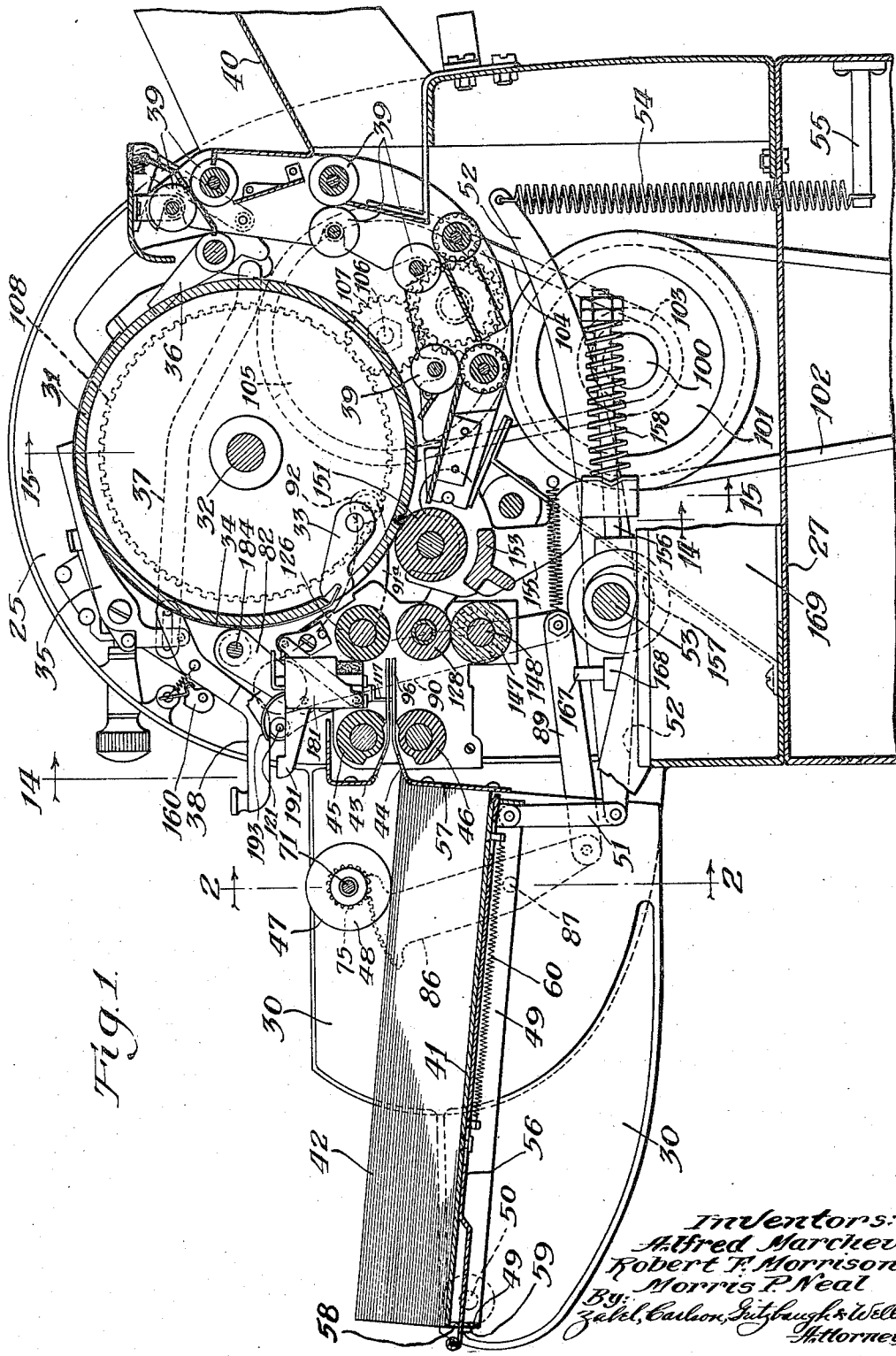
Fig. 1 is a vertical longitudinal cross-sectional view through the preferred form of our improved machine, being more or less diagrammatic and with some of the supporting and operating parts omitted for clearness of illustration.

Figs. 14 and 15 are vertical cross-sectional views taken on an enlarged scale substantially at the line 14—14 and the line 15—15, respectively, of Fig. 1.

Fig. 16 is a horizontal sectional view taken on a reduced scale substantially at the line 16—16 of Fig. 8.

Fig. 17 is an enlarged detailed view, being a section taken substantially at the line 17—17 of Fig. 14.

Fig. 18 is a view similar to Fig. 17 but showing a changed position of the parts; and Fig. 19 is a vertical sectional view taken substantially at the line 19—19 of Fig. 14.

Referring now to the several figures of the drawings, in which corresponding parts are shown by the same reference characters, 25 and 26 indicate frame members at opposite sides of our improved machine, as is perhaps best shown in Fig. 14, such side frame members being connected at their lower ends by transverse frame parts, such as the plate 27 as shown in Fig. 1. At their inner faces, the frame members 25 and 26 are reinforced by heavy auxiliary frame plates 28 which are rigidly mounted in position upon the members 25 and 26 respectively by means of lugs 29 (see Figs. 8 and 14.) At their rear edge portions, the frame members 25 and 26 are provided with rearwardly extending arms 30 for the support of a table as hereinafter described.

Between the frame standards 25 and 26, we have rotatably mounted a drum 31 by means of a shaft 32 journalled in suitable bearings in the standards, as is best shown in Fig. 15. In the arrangement shown, the drum 31 is provided with grippers 33 of any approved type for holding a master sheet 34 in position on the face of the drum, as is shown in Fig. 1. Means is also provided in our machine for controlling the driving connections for the drum, comprising a pawl 35 as shown at the top in Fig. 1, a pawl 36 as shown at the right of the drum in said figure, and cooperative means including a connecting link 37, such pawls and their cooperating mechanism being controlled by a lever 38 at the rear face of the drum. The grippers and the controlling mechanisms as above specified are of any approved type as employed heretofore whereby a master sheet is held in position and whereby the drive of the drum is controlled in such manner as to insure that the drum shall be brought to a stop at the end of each complete revolution, the arrangement being such that the drum is started again into rotation upon the application of suitable downward pressure manually upon the lever 38. The grippers and the drum control mechanism form in and of themselves no part of our present invention, and they are accordingly not described in detail.

A series of rollers 39 and cooperating parts are shown below and at the right of the drum in Fig. 1 for effecting the delivery of copy sheets from the drum to a tray 40, the arrangement including such rollers being covered by a co-pending application, Serial No. 202,398, filed on April 16, 1938, in the name of Alfred Marchev and Robert F. Morrison. This mechanism also forms in and of itself no part of our present invention, and is therefore not described in detail.

At the rear end of our improved machine, we have provided a table 41 suitably mounted in position between the frame arms 30 to hold a pile of copy sheets 42 as is best shown in Fig. 1. At the forward edge of the table, we have provided sheet metal guide plates 43 and 44 which converge forwardly so as to direct copy sheets fed therebetween to feed rollers 45 and 46 rotatably mounted in position as hereinafter described. Sheet feeding rollers 47 and 48 are rotatably mounted in position above the table 41 so as to limit the upward movement of the table 41 and the pile of sheets 42 on the table, the topmost sheet being pressed against the bottom faces of the rollers 47 and 48 by the means hereinafter referred to.

In the arrangement shown, the table 41 is in the form of a sheet of metal having reinforcing flanges 49 thereabout so as to strengthen and reinforce the table, the outer edge of the table being pivotally mounted between the frame arms 30 by means of bolts 50 of any approved type. At its forward end, the table is provided with a downwardly extending link 51 which at its lower end is pivotally connected with a lever 52 which is rotatably mounted upon a cross-shaft 53 extending between the frame members 25 and 26. The forward end of the lever 52 is connected by a coiled spring 54 with a bracket 55 mounted on the framework so as to apply upward pressure on the forward edge of the table 41 for holding the topmost sheet 42 pressed against the feed rollers 47 and 48.

Latch means is provided in connection with the table 41 for holding the table alternatively in fixed position out of engagement with the feed rollers 47 and 48. This latch means comprises a bar 56 slidably mounted on the bottom face of the table 41 so as to be movable forwardly through a suitable opening in the flange 49 of the table for bringing its forward end into engagement with an opening 57 in a fixed portion of the framework (see Fig. 1). At its rear end, the bar 56 extends through an opening 58 through the flange 49 of the table, being provided with a pin or lug 59 adapted by engagement with the rear face of said flange 49 to hold the bar against movement forwardly into operative position. A coiled spring 60 connected with the bar 56 and with the table 41 near its forward edge serves to urge the bar 56 forwardly into operative holding position.

In the arrangement shown, side plates 61 are provided, each in the form of an angle, said plates being provided with downwardly extending pins 62 which extend through slots 63 in the table 41. As is clearly shown in Fig. 2, coiled springs 64 are mounted on the pins 62 between washers 65 on said pins, the arrangement being such as normally to hold the side plates 61 by friction in any desired adjusted position.

At the outer edge of the table, side pressure plates 66 are provided, each of said plates being equipped with a cushion member 67 of sponge rubber or other suitable material for engaging the side edges of the copy sheets and for applying a slight frictional grip thereon. In the arrangement as shown in Figs. 5, 6 and 7, each of the plates 66 is pivotally mounted upon an arm 68 which arms 68 in turn are pivotally mounted upon the outer faces of the side plates 61. Coiled springs 69 are provided for holding the pressure plates 66 normally pressed inwardly for causing the pads 67 to press against the edges of the sheets 42, as is clearly shown in Fig. 7. Set screws 70 are adjustably mounted in the arms 68 adapted by engagement with the side plates 61 to limit the inward movement of the plates 66 and pads 67.

When it may be preferred to dispense with the use of the plates 66, they may be readily reversed in their position, as is shown in dotted lines at one corner of the table 41 in Fig. 5, the plates 66 in such reversed position being held in spaced relation with respect to the pile of sheets.

The means for mounting the feed rollers 47 and 48 in position and for driving them in timed relation comprises a shaft 71 (see Fig. 2) mounted between the backwardly projecting frame arms 30. At the right in Fig. 2, the shaft 71 is rotatably mounted in a socket member 72 from which the shaft is readily releasable by movement toward the shaft. At its opposite end, the shaft 71 is releasably connected with a short shaft 73 journalled in the frame and held against axial movement with respect to the frame by a head 74 at one end and a gear 75 fixedly mounted thereon at its opposite end. The releasable connection between the shafts 71 and 73 is effected by the use of a sleeve 76 slidably mounted upon the shaft 71 so as to embrace the inner end of the shaft 73, being normally held in such embracing position by a spring 77. The sleeve 76 is provided with a pin 78 engaging a notch 79 in the end of the shaft 73 for causing the sleeve and shaft to rotate in unison. When it is desired to remove the shaft 71 from the machine, the sleeve 76 can be moved toward the right in said Fig. 2 so as to clear the end of the shaft 73, whereupon the shaft and its associated parts can be lifted out of position.

The means for mounting the rollers 47 and 48 upon the shaft 71 comprises a two-part sleeve 80, upon the parts of which the rollers 47 and 48 are fixedly mounted, the parts of the sleeve 80 being arranged for providing a chamber 81 therein, as is best shown in Fig. 4, for the reception of a clutch member 82 fixedly mounted upon the shaft 71. As is clearly shown in Fig. 4, the clutch member 82 is so arranged as to cooperate with rollers 83 for applying power from the shaft 71 for driving the feed rollers 47 and 48 in counterclockwise direction in Fig. 4, while permitting the shaft 71 to rotate in clockwise direction in said Fig. 4 without causing corresponding rotary movement of the feed rollers 47 and 48. For accomplishing this purpose, the clutch rollers 83 are mounted in tapering recesses 84, coiled springs 85 being provided for pressing the rollers 83 yieldingly into gripping position with respect to the tapered recesses.

The means for driving the shaft 71 comprises a lever 86 pivotally mounted upon a heavy bolt 87, having gear teeth 88 on its upper end portion in position to mesh with the gear 75. At its lower end, the lever 86 is pivotally connected with a link 89 which in turn is pivotally connected with the long arm 90 of a bellcrank lever which is pivotally mounted upon a lug 91 extending inwardly from the frame member 25, as is best shown in Fig. 14. The short arm 91a of said bellcrank lever is provided at its end with a roller 92 in position to engage a cam 93 fixedly mounted upon the shaft 32, as is clearly shown in Fig. 14. The arrangement is such that upon each rotation of the drum 31 the cam 93 gives the bellcrank lever 90—91a a movement in clockwise direction in Fig. 8 for swinging the lever 86 in clockwise direction in said Fig. 8 for driving the feed rollers 47 and 48 in counterclockwise direction in said figure so as to feed a sheet forwardly toward the right in said figure. A spring 94 is provided, connected in the arrangement shown with the link 89 so as to urge the link yieldingly toward the right in Fig. 8 so as to oppose the movement of the lever 90 in clockwise direction in said Fig. 8 by the cam 93. The arrangement of the cam 93 is such as to provide for the movement of the feed rollers 47 and 48 as above described during the interval when the drum 31 is moving from about the position shown in Fig. 8 to the position shown in Fig. 9. Upon the rotation of the feed rollers 47 and 48, the copy sheet at the top of the pile 42 is fed forward between the feed rollers 45 and 46 and is brought into engagement with a stop device as hereinafter described so as to be buckled as shown in Fig. 9. As soon as the feed rollers 45 and 46 have been rotated slightly beyond the positions as shown in Fig. 9 so as to grip the copy sheet between said rollers, the levers 86 and 90 are given an inoperative movement by the spring 94 for bringing them back to the position as shown in Fig. 8, the shaft 71 in such movement of the levers being adapted to rotate without causing rotation of the feed rollers 47 and 48.

In the arrangement shown (see particularly Fig. 16), the feed rollers 45 and 46 are formed in sections spaced apart longitudinally of the rollers, the guide plates 43 and 44 being provided with openings 95 therethrough for the projection of the segments of the rollers into operative engagement with each other. As is clearly shown in Fig. 16, the plates 43 and 44 are further cut away at their forward ends to provide fingers 96 in spaced relation longitudinally of said plates. As is clearly shown in Fig. 8, the rollers 45 and 46 are mounted in position by means of shafts 97 and 98, respectively, journalled in the frame members 25 and 26. The rollers 45 and 46 are driven constantly at a uniform speed of rotation during the rotation of the drum 31, but they are cut away at 99 at a portion of their periphery so as to cause the rollers to stand in spaced relation to each other during a portion of each complete revolution of the rollers.

For driving the drum 31 and its associated parts, we have provided a short shaft 100 driven by a pulley 101 and a belt 102 from any suitable source of power, the shaft 100 being provided with a pulley 103 which in turn is connected by a belt 104 with a pulley 105 on a shaft 106, as is best shown in Figs. 1 and 15. As is clearly shown at the left in said Fig. 15, the shaft 106 is provided with a pinion 107 which meshes with a gear 108 rotatably mounted upon the shaft 32. In the arrangement shown, the gear 108 is connected with the drum 31 through the medium of a ratchet-wheel 109 and cooperating parts in a manner well understood by those familiar with the art, such driving means forming in and of itself no part of our present invention.

At the end of the drum at the right in said Fig. 15, the drum is provided with a ring gear 110 rigidly mounted thereon, such gear meshing with an idler pinion 111, as shown at the left in Fig. 19. The idler pinion 111 drives a pinion 112 mounted as hereinafter described, which in turn drives an idler pinion 113 which meshes with a pinion 114 mounted upon the shaft 97 of the feed roller 45. At the opposite end of the machine, the shaft 97 is provided with a second pinion 115 which meshes with a pinion 116 mounted on the shaft 98 of the roller 46 for causing the feed rollers 45 and 46 to drive in cooperative relation to each other in the arrangement as shown in Figs. 8 and 9. The arrangement is such that the rollers 45 and 46 are driven at the same surface speed as that of the drum 31 and that the rollers 45 and 46 have an integral number of complete revolutions for each single revolution of the drum. The result is that the rollers 45 and 46 at each cycle of operations assume at a critical point in the cycle the positions as shown in Fig. 8 relative to the position of the drum as therein shown.

Figure 10:
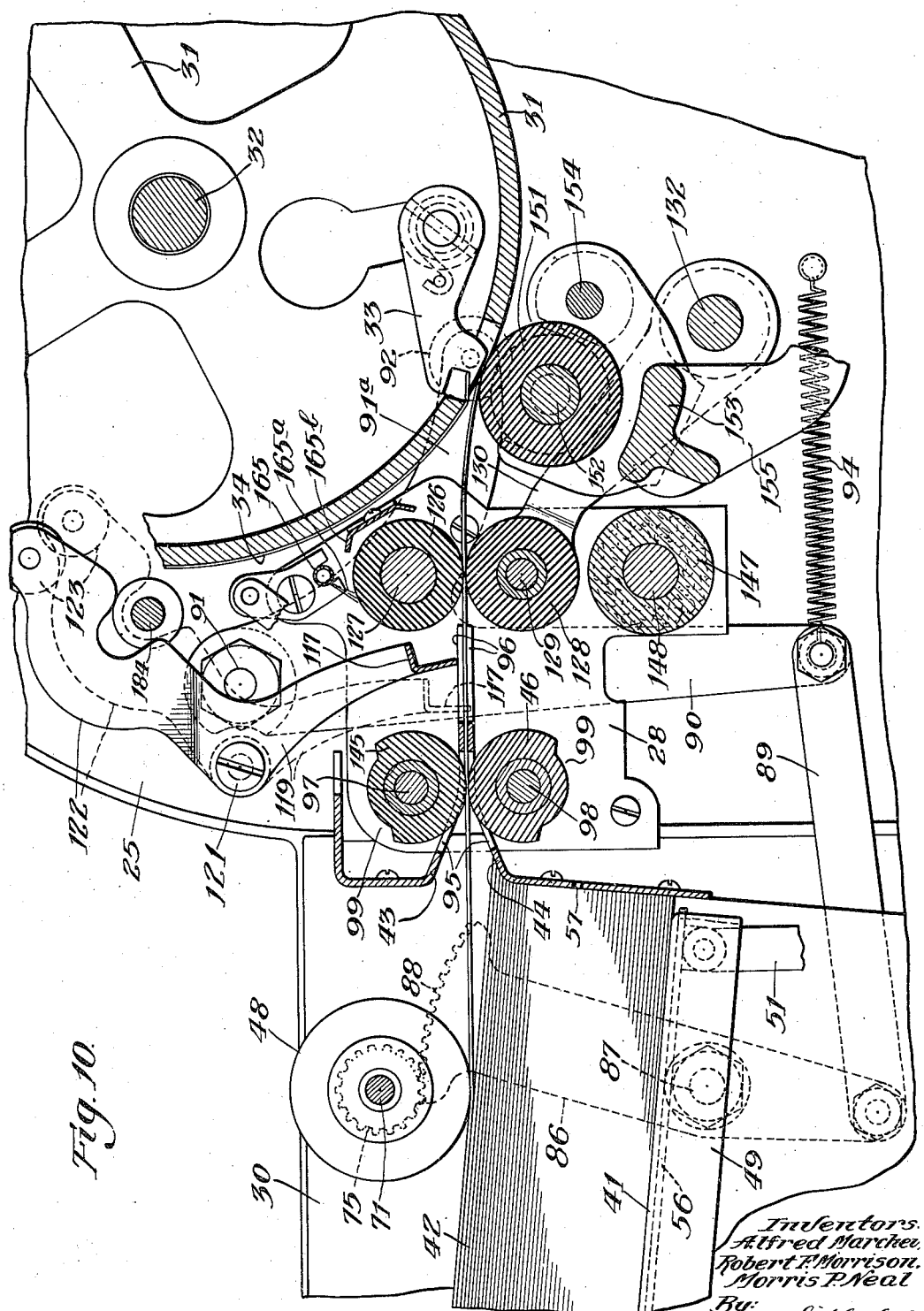
Fig. 10 is another view of substantially the same portion of the machine as is shown in Fig. 8, but with some parts added and others omitted and with some of the parts in further changed position as compared with Fig. 8, and with additional parts shown in cross-section.

The stop means adapted to cooperate with the feed rollers 45 and 46 for assuring that the copy sheets shall be gripped in squarely transverse position for said feed rollers 45 and 46 comprises a cross-bar 117 (see Fig. 10) in the form of an angle mounted at its ends upon bell-crank levers 118 and 119 which are pivotally mounted at their upper ends upon long studs 120 projecting inwardly from the inner faces of the frame members 25 and 26, the connection being effected through the medium of machine screws 121. The arm 119, shown at the left in Fig. 14, is provided with an upward extension 122 carrying a roller 123 thereon in position to engage a cam 124 mounted rigidly upon the shaft 32, as is clearly shown in Fig. 15. As is shown in Fig. 14, the cross-bar 117 is cut away at intervals therealong so as to provide downwardly projecting fingers 125 adapted upon the downward movement of the stop bar 117 to extend downwardly between the fingers 96 of the guide plates 43 and 44. The cam 124 is so arranged as to cause the stop bar 117 to be moved from its inoperative position as shown in solid lines in Fig. 10 to its operative position as shown in dotted lines in said Fig. 10 at the desired critical moment. That is to say, at each time when the drum 31 moves from the position shown in Fig. 8 to the position shown in Fig. 9, the stop bar 117 is held in its lowered operative position throughout the period when said rollers 45 and 46 stand in spaced relation to each other by reason of the circumferential mutilation of said rollers at 99 as above described.

Combination forwarding and moistening means for the copy sheets is provided located in advance of the feed rollers 45 and 46. This means comprises a roller 126 mounted in position by means of a shaft 127 which is driven by the pinion 112 above referred to, the arrangement being such that the roller 126 is driven at the same surface speed as the drum 31. Below the roller 126, we have provided backing means in the form of a vibrator roller 128 mounted by means of a shaft 129 between arms 130 and 131 which are rigidly mounted opposite each other upon opposite ends of a rock shaft 132. At one end, the shaft 132 is journalled in a stud 133 carried by the frame 25, the opposite end of said shaft being mounted upon a screw-threaded pin 134 carried by the frame member 26 as shown in Fig. 16, the arrangement being such that upon the retraction of the pin 134 the shaft 132 and the vibrator roller can be removed readily from the machine. The means for mounting the arms 130 and 131 on the shaft 132 comprises collars 135 and 136, upon the latter of which an arm 137 is rotatably mounted. As is clearly shown in Fig. 16, the arm 131 is provided with an extension 138 alongside of the arm 137, and the arm 137 is provided with an extension 139 opposite the arm 131. Upon the collar 136, we have mounted a coiled spring 140 arranged with one end of the spring bearing on a pin 141 carried by the extension 139 and with the opposite end bearing on a pin 142 carried by the extension 138, the pin 142 extending loosely through an enlarged opening 143 in the arm 137. The arrangement is such that the pin 142 extending loosely through the opening 143 acts as a stop for limiting the swinging movement of the arm 137 with respect to the arms 130 and 131. The spring 140 is arranged so as to urge the arm 137 to the limit of its movement in clockwise direction in Fig. 8 with respect to the arm 131. At its forward end, the arm 137 is provided with a roller 144 adapted to engage a cam 145 mounted upon the end of the drum at the right in Fig. 15 opposite the ring gear 110. A heavy coiled spring 146 extending downwardly from the pin 141 urges the arm 137 to move in counterclockwise direction in Fig. 8 for holding the vibrator roller 128 out of engagement with the feed roller 126 in the position as shown in said Fig. 8.

Below the vibrator roller 128, we have provided a roller 147 formed of felt or other suitable absorbent material journalled by means of a shaft 148 upon a fixed axis in the framework. The arrangement is such that the vibrator roller 128 is held by the spring 146 in engagement with the roller 147 except when the cam 145 by its action upon the arm 137 causes the vibrator roller to be moved upwardly so as to press upon the feed roller 126. In the arrangement shown, the rollers 126 and 128 are formed of rubber, but our invention is not to be limited to the use of this particular material except so far as the claims may be so limited.

The arrangement is such that at about the time when the stop bar 117 is lifted to its inoperative position, when the drum has barely passed the position in which it is shown in Fig. 9, the cam 145 acts to move the vibrator roller 128 upwardly so as to engage the feed roller 126 or to press a copy sheet firmly against such feed roller, the vibrator roller 128 being adapted to rotate with the driven feed roller 126. When the roller 128 has been held in position to press against the roller 126 for a period corresponding to the maximum length of copy sheet to be used in the machine, the roller 128 is again moved downwardly by the spring 146 under the control of the cam 145 so as to engage the roller 147. Upon such engagement, the surface of the roller 128 is wiped effectively for removing any moisture therefrom.

In our improved machine, the roller 147 is driven in the opposite direction from that in which the roller 126 rotates. This drive of the roller 147 is effected by an idler pinion 149 meshing with the pinion 113, which pinion 149 in turn meshes with a pinion 150 fixedly mounted upon the shaft 148 of the roller 147. This drive means is clearly shown in Fig. 19. With the rollers 126 and 147 rotating in opposite directions, as is indicated by the provision of two idler pinions between said rollers, it will be understood that the vibrator roller 128 is caused to reverse its direction of rotation upon each movement from one of said driven rollers to the other.

As is usual in machines of this type, a platen roller 151 is employed for pressing the copy sheets against the face of the master sheet 34 mounted on the drum 31. The platen roller 151 is rotatably mounted by means of a shaft 152 upon a heavy bracket 153 which is pivotally mounted adjacent to the drum by means of pivot pins 154. The bracket 153 is provided at about its middle point with a depending arm 155 through which a rod 156 extends connected at its rear end by an eccentric mechanism 157 with the shaft 53. A heavy spring 158 is mounted upon the rod 156 bearing at its rear end on the arm 155 and at its forward end upon a nut 159 secured by means of screw-threads on the end of the rod. The arrangement is such that the spring 158 presses the platen roller 151 against the face of the drum 31, the effective strength of the spring 158 being adjustable by a rotary movement of the shaft 53.

The means for holding the control lever 38 in its lowermost position so as to provide for rotation of the drum 31 without intermediate stops, comprises a cam device 160 pivotally mounted in position adjacent to the lever 38. When the cam 160 stands in the position as shown in Fig. 12, the lever 38 is permitted to rise to its normal raised position. When however the cam is turned to the position as shown in Fig. 13, the lever 38 is held in its lowered position so as to render the lever 38 and its cooperating parts inoperative with respect to the rotation of the drum. A flat spring 161 is mounted on the frame in position by engagement with a lug 162 on the cam to hold the cam normally in the position as shown in Fig. 12. A flat face portion of the cam engaging the lever 38 serves to hold the cam effectively in the position as shown in Fig. 13. For holding the cam 160 in position, and for giving it a rotary movement as desired, we have mounted the cam upon a shaft 163 having a knob 164 on its outer end.

The means for applying a film of solvent upon the feed roller 126 for transfer to the face of a copy sheet passing between the rollers 126 and 128 comprises a pipe 165 extending across the machine immediately above said roller 126. At one end, said pipe 165 is connected with a flexible tube 166 which in turn is connected at its lower end with the discharge pipe 167 of a pump 168 adapted upon an operative stroke to deliver solvent upwardly through said tube from a tank 169 in which said pump is mounted. The pump 168 is to be of any approved type. In the arrangement shown a pump rod 170 is provided, normally held yieldingly in its lowermost position by a spring not shown, the arrangement being such that when the pump rod is moved upwardly and then released the spring serves to give the pump rod an operative downward movement for forcing the solvent or other liquid in the tank 169 upwardly through the tube 166. Upon such upward movement of the solvent, it is delivered in a series of sprays from the pipe 165 to the top face of the roller 126 as indicated at 165—a in Fig. 9, such solvent being distributed evenly along the roller 126. For protecting the master sheet 34 carried by the drum 31 from the spray and for holding the free end of the master sheet away from the roller 126, we have provided a shield 165—b in the form of a plate extending completely across the machine.

For moving the pump rod 170 upwardly, we have provided a well-known type of operating mechanism comprising a three-armed lever 171 pivotally mounted upon a horizontal axis at 172 (see Fig. 19), a roller 173 on said lever being actuated by a cam 174 for moving the pump rod 170 upwardly. For limiting the movement of the lever 171 in counterclockwise direction in Fig. 19, we have provided a cam 175 in position to engage a roller 176 mounted on said lever 171. The cam 174 is fixedly mounted upon the drum 13, as is shown in Fig. 15, and is arranged so as to give the pump rod an upward movement during the time when the drum 31 is coming to the position as shown in Fig. 9 so that the pump shall be in condition for delivering solvent upwardly through the tube 166 at the time when a copy sheet begins its movement between the rollers 126 and 128. The cam 175 is preferably mounted upon a shaft 177 extending to the end of the machine for adjusting the cam to any desired angular position for controlling with a high degree of nicety the length of the stroke of the lever 171.

The means for distributing the solvent sprayed upon the roller 126 evenly along the face of the roller comprises an absorbent pad 178 mounted in position to press against the face of the roller, as is best shown in Fig. 9. The means for mounting the pad 178 in position comprises a plate 179 formed of sheet metal having a strengthening flange 180 formed on its upper edge and having its end portions turned backwardly to provide arms 181. The arm 181 at each end of the plate 179 is movably supported in position by means of two links 182 and 183 which are pivotally mounted upon the framework in substantially parallel relation to each other, extending downwardly and backwardly from their point of connection with the frame to their point of connection with the arm 181. The arrangement is such that the plate 179 and its connected parts can be moved upwardly and outwardly away from the drum 31, such movement being effected substantially without angular movement of the plate 179.

The pivotal connection between the arms or links 182 and the framework of the machine is effected by means of a shaft 184 upon which the arms 182 are rigidly mounted. For controlling the position of the shaft 184, we have provided a notched plate 185 fixedly mounted on the shaft 184, such notched plate being engaged by a bowed spring 186 which is pivotally connected with the framework below the shaft. The arrangement is such that the spring 186 holds the shaft 184 yieldingly in the position as shown in Fig. 17, which corresponds with the operative lowered position of the plate 179 and the pad 178. When however the shaft 184 is rotated in counterclockwise direction in Fig. 17 for raising the plate 179, the spring 186 passes centers and in its changed position holds the shaft 184 in the position as shown in Fig. 18 corresponding to the raised position of the pad 178.

The means for mounting the pad 178 upon the plate 179 comprises a second plate 187 which is pivotally mounted at its lower edge portion between the arms 181 of the plate 179. Upon the front face of the plate 187, we have provided a block of rubber 188 upon which the pad 178 is removably secured in any suitable manner. The plate 187 is provided along its upper edge with a flange 189 extending forwardly over the top edges of the block 188 and the pad 178 and with a flange 190 at its lower edge underneath the block 188. The plate 187 is normally held in its operative raised position as shown in Fig. 9 by means of latch devices 191 carried by the end flanges 181 and releasably engaging pins 192 mounted on the rear face of the plate 187. The arrangement is such that when the parts are in the position as shown in Fig. 9 the pad 178 is pressed yieldingly against the face of the roller 126. When it is desired to have access to the pad 178, the plate 179 and its connected parts are raised and moved backwardly by the application of suitable pressure upon a finger piece 193 mounted on the rear face of the plate 187. When the parts have been raised and have been locked by the spring 186 in such raised position, the latches 191 can be released and the plate 187 and the pad 178 can then be turned backwardly and downwardly for providing access directly to the pad 178.

It is believed that the operation of the apparatus will be fully understood from the above description so that it is unnecessary to describe the same further in detail. The top sheet of the pile of sheets 42 on the table 41 is fed forwardly upon each rotary movement of the feed rollers 47 and 48 in counterclockwise direction in Fig. 1. It will be understood that the feed rollers 45 and 46 are given a plurality of complete revolutions for each complete revolution of the drum 31, the parts being timed so as to effect the forward movement of the sheet from the pile 42 during a portion of the revolution of the rollers 45 and 46 which takes place immediately following the arrival of the drum into the position as shown in Fig. 1. This forward movement of the sheet occurs in each instance in that portion of the revolution specified in which the rollers are in spaced relation to each other. The stop bar 117 is moved downwardly so as to stand in operative stopping position at the time when a sheet is fed between the rollers 45 and 46, the stop being withdrawn just at the time when the rollers 45 and 46 begin to grip the sheet, the vibratory roller 128 being also moved upwardly at this same time. The rollers 45 and 46 then forward the sheet to the rollers 126 and 128 so as to be gripped by said rollers prior to the time when the sheet is released by the rollers 45 and 46, such rollers 126 and 128 being maintained in gripping relation to the sheet until the sheet passes beyond said rollers. During the major portion of this period, the rollers 126 and 128 co-operate with the drum and the platen roller 151 for controlling the sheet.

While we prefer to employ the form of apparatus as shown in our drawings and as above described, it is to be understood that our invention is not limited to the construction illustrated except so far as the claims may be so limited, it being understood that changes might well be made in the form and arrangement of the parts without departing from our invention.

We claim:

1. In a duplicating apparatus, the combination of a pair of feed rollers rotatably mounted on fixed axes in cooperative relation for forwarding a sheet therebetween and each cut away at one side so as to be inoperative for forwarding a sheet during a portion of their rotary movement, supporting means along which a copy sheet is movable into position between said rollers, means for feeding a sheet forward at predetermined timed intervals to said rollers, and means for driving said rollers and timed so as to keep the rollers in spaced relation to each other by reason of said cut away portions while a sheet is being forwarded thereto and then to grip the sheet for carrying it forward after the sheet has passed a normal predetermined distance between the rollers.

2. In a duplicating apparatus, the combination of a pair of feed rollers rotatably mounted in co-operative relation and cut away so as to be in spaced relation to each other at predetermined timed intervals during their rotation, means for driving said rollers, supporting means for a pile of copy sheets, means actuated at timed intervals for feeding a sheet forward from said supporting means between said rollers when they are in spaced relation, a stop movably mounted in advance of said rollers, and means for moving said stop at timed intervals into position to limit the forward movement of the sheet, said stop being located in position for stopping the forward edge of the sheet short of the point to which said feeding means would normally deliver the sheet so as to cause the sheet to be buckled slightly between said rollers and said feeding means for insuring that said rollers shall have a directly transverse grip on said sheet.

3. In a duplicating apparatus, the combination of a pair of feed rollers effective during only a portion of the time for forwarding a sheet therebetween, means for driving said rollers, supporting means along which a sheet is movable so as to be directed between said rollers, and stop means in advance of said rollers adapted when in operative position to limit the forward movement of a sheet between said rollers, said stop means comprising arms pivotally mounted on horizontal axes substantially opposite the ends of said rollers, a cross-bar carried by said arms adapted in one position of said arms to stand in the path of movement of a sheet from said rollers, and means comprising a cam driven in timed relation to the operation of said rollers for holding said cross-bar in operative stopping position during at least one of the periods when said rollers are inoperative for feeding a sheet and adapted to withdraw said cross-bar from the path of the sheet at about the time when the sheet is gripped by the rollers.

4. In a duplicating apparatus, the combination of a pair of feed rollers each comprising a plurality of sections in spaced relation to each other longitudinally and effective during only a portion of the time for forwarding a sheet therebetween, means for driving said rollers, supporting means along which a sheet is movable so as to be directed between said rollers, guides in the form of plates converging forwardly for directing sheets to the rollers and provided with openings therealong for the several sections of the rollers and each comprising laterally spaced fingers extending forwardly in advance of said rollers, stop means comprising a cross-bar having laterally spaced fingers adapted to be lowered between the fingers of said guides so as to engage and stop a sheet passing forward from said rollers, and means for raising and lowering said cross-bar in such timed relation as to be in lowered stopping position during the time when said rollers are ineffective for forwarding the sheet.

5. In a duplicating apparatus, the combination of two pairs of feed rollers in horizontally spaced relation to each other and each effective during only a portion of their operation to forward a sheet therebetween, stop means movably mounted between said pairs of rollers adapted in one position to stop a sheet moving forward between the rollers of one of said pairs, and means for holding said stop means in said operative stopping position during the time when said one pair of feed rollers are ineffective for forwarding the sheet.

6. In a duplicating apparatus, the combination of two pairs of feed rollers in horizontally spaced relation to each other and each effective during only a portion of their operation to forward a sheet therebetween, means for causing all of said rollers to rotate at the same surface speed, and means for feeding a sheet between the rollers of one pair at the time when said rollers are ineffective for forwarding the sheet, the arrangement being such that the rollers of said one pair when they become operative for forwarding the sheet continuously grip the sheet until the sheet passes into the grip of the other pair of rollers and that said other pair of rollers thereafter continuously grip the sheet for the completion of its movement between the rollers.

7. In a duplicating apparatus, the combination of a frame, a drum rotatably mounted on said frame, a pair of rollers mounted on said frame in cooperative relation with at least one of said rollers mutilated so as to make the rollers effective during only a portion of each rotation for forwarding a sheet between the rollers, a second pair of rollers adjacent to said first-named pair movable into and out of operative relation to each other for forwarding a sheet, means for causing said drum and all of said rollers to rotate at the same surface speed, means for feeding a sheet between the rollers of said first-named pair upon each rotation of the drum at the time when said rollers are ineffective for forwarding the sheet, and means for holding the rollers of said second pair in operative relation to each other for gripping a sheet continuously from the time when the sheet is presented to said rollers until about the time when the sheet passes beyond said rollers.

8. In a duplicating apparatus, the combination of a pair of feed rollers rotatably mounted on fixed axes in cooperative relation for forwarding a sheet therebetween and cut away at the side of at least one of said rollers for causing the rollers to be in spaced relation to each other during a portion of their rotation, a second pair of feed rollers in spaced relation to said first-named pair and comprising a roller rotatably mounted on a fixed axis and a vibrator roller, means controlling the position of said vibrator roller adapted to hold said roller in spaced relation to said cooperating roller during substantially the same period as that during which said first-named pair of rollers are ineffective for forwarding a sheet, stop means movably mounted between said pairs of rollers adapted in one position to stop a sheet moving forward between the rollers of said first pair, and means for holding said stop means in position to stop the forward movement of a sheet during at least one of the periods when said feed rollers are ineffective for forwarding a sheet and adapted to withdraw said stop means from effective stopping position at about the time when the sheet is gripped by the rollers.

9. In a duplicating apparatus, the combination of a pair of feed rollers comprising a roller rotatably mounted on a fixed axis and a cooperating vibrator idler roller, a third roller having an absorbent facing rotatably mounted in position to be engaged by said vibrator roller when the vibrator roller moves away from said first-named roller, and means for driving said first-named roller and said third roller whereby said vibrator roller is caused to rotate by friction first by one driven roller and then by the other.

10. In a duplicating apparatus, the combination of two rollers in vertically spaced relation to each other, a rock shaft journalled in position adjacent to said rollers, arms carried by said shaft, a vibrator roller journalled on said arms between said first-named two rollers so as to be movable into engagement with said rollers alternatively, a third arm mounted on said shaft so as to have a slight amount of play with respect thereto, a spring tending to move said third arm to the limit of its motion in one direction with respect to said shaft, and means acting on said third arm for moving said vibrator roller alternately from one of said first-named rollers to the other.

11. In a duplicating apparatus, the combination of two rollers rotatably mounted on fixed axes in vertically spaced relation to each other, a rock shaft journalled in position adjacent to said rollers, an arm fixedly mounted on one end of said shaft, a collar fixedly mounted on the opposite end of said shaft, a second arm fixedly mounted on said collar opposite said first-named arm, a vibrator roller journalled on said arms between said first-named two rollers so as to be movable into engagement with said two rollers alternatively, a third arm loosely mounted on said collar adjacent to said second arm, stop means carried by said second and third arms permitting said third arm to have only a slight swinging movement with respect to said second arm, spring means pressing on said second and third arms urging said third arm to the limit of its motion with respect to said second arm, and means for swinging said third arm for causing said vibrator roller to engage said first-named two rollers alternately.

12. In a duplicating apparatus, the combination of a drum, means for rotating said drum, control means comprising a push lever adapted when in use to stop the rotation of the drum upon the completion of each revolution thereof and to start the drum again into rotation upon an operative stroke manually and adapted when the lever is held continuously out of operative position to permit the drum to revolve without stopping, and a spring-controlled cam member adapted in one position to hold said lever out of operative position.

13. In a duplicating apparatus, the combination of a frame, two cylindrical members rotatably mounted in said frame in cooperative relation to each other for forwarding a sheet between them, means for driving said rotary members, a table pivotally mounted at its outer edge portion on a fixed axis on said frame at about the same level as that of said rotary members, a feed roller rotatably mounted above said table, means for pressing the inner edge portion of said table upwardly for pressing the top sheet of a pile of sheets on the table into engagement with said feed roller, means for rotating said feed roller at timed intervals for feeding the engaged sheet forward to said rotary members, and latch means adapted alternatively to hold said table in fixed position in downwardly spaced relation to said feed roller, comprising a bar slidably mounted on the bottom face of said table and movable into holding engagement with a portion of the frame, spring means normally urging said slide bar into its effective holding position, and releasable means for holding said slide bar in retracted position against the action of said spring.

14. In a duplicating apparatus, the combination of a frame, two cylindrical members rotatably mounted in said frame in cooperative relation to each other for forwarding a sheet between them, means for driving said rotary members, a table mounted on said frame and movable vertically thereon, yielding means urging said table upwardly for bringing the top sheet of a pile of sheets thereon into position to be fed forward to said rotary members, a feed roller rotatably mounted above said table in position to engage the top sheet of said pile and serving thus to limit the upward movement of the table, a gear, means comprising a free wheeling clutch device connecting said gear with said feed roller for driving said feed roller in the direction for forwarding a sheet to said rotary members, a lever pivotally mounted on said frame having gear teeth operatively engaging said gear, and means for giving said lever an operative stroke for driving said feed roller.

15. In a duplicating apparatus, the combination of a frame, two cylindrical members rotatably mounted in said frame in cooperative relation to each other for forwarding a sheet between them, means for driving said rotary members, a table mounted on said frame and movable vertically thereon, yielding means urging said table upwardly for bringing the top sheet of a pile of sheets thereon into position to be fed forward to said rotary members, a gear rotatably mounted on a transverse axis above the level of said table at one side of the table and held normally against axial movement, a shaft releasably connected at one end with said frame and releasably connected at its opposite end with said gear so as to be readily removable from the frame, a feed roller rotatably mounted on said shaft in position to engage the top sheet of said pile of sheets on the table, means comprising a free wheeling clutch device connecting said feed roller with said shaft for driving said roller in the direction for forwarding a sheet to said rotary members, and means for rotating said gear at timed intervals.

16. In a duplicating apparatus, the combination of a frame, two cylindrical members rotatably mounted in said frame in cooperative relation to each other for forwarding a sheet between them, means for driving said rotary members, a table mounted on said frame and movable vertically thereon, yielding means urging said table upwardly for bringing the top sheet of a pile of sheets thereon into position to be fed forward to said rotary members, a short shaft journalled in the frame on a transverse axis above the level of said table at one side of the table, a gear fixedly mounted on the outer end of said short shaft, means for holding said short shaft and gear against axial movement with respect to said frame, a second shaft aligned with said first-named shaft and having one end rotatably mounted in a socket at the opposite side of the table from said gear, a sleeve slidably mounted on said second shaft so as to engage said first-named shaft for releasably connecting said shafts for rotation together, spring means normally holding said sleeve in operative connecting position, a feed roller rotatably mounted on said second shaft in position to engage the top sheet of said pile of sheets on the table, means comprising a free wheeling clutch device connecting said feed roller with said second shaft for driving said roller in the direction for forwarding a sheet to said rotary members, and means for rotating said gear at timed intervals.

17. In a duplicating apparatus, the combination of a table adapted to support a pile of copy sheets thereon, side plates movable inwardly and outwardly on said table, pressure plates provided with compressible pads on their inner faces movably mounted on said side plates, and spring means for pressing said pressure plates inwardly against the pile of sheets on said table.

18. In a duplicating apparatus, the combination of a table adapted to support a pile of copy sheets thereon, side plates transversely on the table to accommodate copy sheets of different widths therebetween, arms pivotally mounted on vertical axes at opposite sides of the table, pressure plates pivotally mounted on said arms in position to press against the sides of the pile of sheets on the table, and springs for pressing said arms inwardly, said pressure plates being capable of being reversed on said arms for carrying said pressure plates out of engagement with the pile of sheets.

19. In a duplicating apparatus, the combination of a feed roller, means for applying solvent on the face of said roller, a plate, an absorbent pad carried by said plate, and adjustable mounting means for said plate adapted to hold said plate in position for pressing said pad yieldingly against said feed roller and adapted alternatively to move said plate upwardly and outwardly away from the roller and adapted in such changed position to move the pad out of engagement with the plate for providing ready access to the pad.

20. In a duplicating apparatus, the combination of a frame, a feed roller rotatably mounted on said frame, means for applying solvent on the face of said roller, a plate, two pairs of links pivotally connected at their upper ends with said frame at opposite ends of said plate and extending downwardly and backwardly therefrom with the links of each pair substantially parallel with each other, means for pivotally mounting said plate on the lower end portions of said links, and an absorbent pad mounted on said plate in position to engage the face of said feed roller when the plate is in its lowered position.

21. In a duplicating apparatus, the combination of a frame, a feed roller rotatably mounted on said frame, means for applying solvent on the face of said roller, a plate, two pairs of links pivotally connected at their upper ends with said frame at opposite ends of said plate and extending downwardly and backwardly therefrom with the links of each pair substantially parallel with each other, means for pivotally mounting said plate on the lower end portions of said links, a second plate pivotally connected at its lower edge with said first-named plate on an axis extending longitudinally thereof so as to stand in raised position in substantial parallelism with said first-named plate and adapted alternatively to be folded back away from said first-named plate, an absorbent pad mounted on said second plate so as to be held between the plates in position to engage said feed roller, and latch means for holding said second plate releasably in its raised position.

22. In a duplicating apparatus, the combination of a feed roller, means for applying solvent on the face of said roller, a plate, an absorbent pad carried by said plate, a pair of links pivotally connected with said plate at each end portion of the plate for holding the pad in contact with the feed roller and adapted upon a swinging movement backwardly and upwardly to carry the pad out of engagement with the feed roller, and spring means adapted in one position of the parts to press said pad yieldingly against the feed roller and adapted alternatively in a past centers changed position of the parts to hold the pad in raised position.

23. In a duplicating apparatus, a copy sheet moistening roller, an absorbent roller in spaced relation thereto, means for applying moisture to said first-named roller independently of said second roller, and a third roller adapted by movement alternately toward said moistening roller and said absorbent roller to cooperate with the moistening roller for forwarding a copy sheet and then to deposit surplus moisture on said absorbent roller.

24. In a duplicating apparatus, a copy sheet moistening roller, an absorbent roller, means for applying moisture to said first-named roller independently of said second roller, a third roller having a non-absorbent facing adapted by movement toward said moistening roller to cooperate therewith for forwarding a copy sheet and adapted by engagement with said absorbent roller to have surplus moisture removed therefrom, and means for moving said third roller alternately toward said moistening roller and said absorbent roller.

25. In a duplicating apparatus, a copy sheet moistening roller, an absorbing roller, means for mounting said rollers in spaced relationship with respect to each other, a counter-roller, a second mounting means for said counter-roller, and means to cause relative motion of said first mounting means with respect to said second mounting means whereby said counter-roller will cooperate with said moistening roller for moistening a copy sheet fed therebetween at predetermined intervals and will engage said absorbing roller at other times.

26. In a duplicating apparatus, a moistening roller, an absorbing roller, a counter-roller, resilient means for holding said counter-roller against said absorbing roller, driving means for driving said moistening roller and said absorbing roller, a cam associated with said driving means, a cam rider cooperating with said cam and associated with said counter-roller for urging said counter-roller into engagement with said moistening roller, and a second resilient means associated with said cam rider and said counter-roller to provide a yielding engagement between said counter-roller and said moistening roller.

27. In a duplicating apparatus, a rotatable master sheet carrying drum, driving means therefor, two feed rollers driven by said driving means and adapted to engage each other at predetermined times for feeding copy sheets to said rotatable drum in timed relationship to the rotation of said drum, means for applying a film of moisture to one of said feed rollers, moisture absorbing means adapted to contact said other feed roller at intervals, and means controlled by said driving means for separating said feed rollers and for causing said second-mentioned roller and said moisture absorbing means to come into operative engagement with each other to condition said second-mentioned roller for a subsequent feeding operation.

28. In a duplicating apparatus, a rotatable master sheet carrying drum, driving means therefor, a feed roller driven by said driving means, a second feed roller adapted to engage said first feed roller at predetermined times for feeding copy sheets to said rotatable drum in timed relationship to the rotation of said drum, means for applying a film of moisture to said feed roller, moisture absorbing means adapted to contact said second feed roller, and means controlled by said driving means for withdrawing said second feed roller from contact with the first feed roller and into contact with said moisture absorbing means to condition said second feed roller for a subsequent feeding operation.

29. In a duplicating machine, combined copy sheet feeding and moistening apparatus comprising a moistening roller, a counter-roller adapted to contact said moistening roller at predetermined times, moisture absorbent means mounted in spaced relationship to said moistening roller, means for driving said moistening roller, and means associated with said driving means for causing alternate engagement of said counter-roller with said moistening roller and said moisture absorbent means.

30. An apparatus for moistening copy sheets comprising a moistening roller, means for supplying liquid to the surface of said moistening roller, moisture absorbent means contacting the surface of said moistening roller to remove the excess moisture therefrom, non-absorbent backing means to press a copy sheet against said moistening roller, and means in the form of an absorbent roller intermittently engaging said backing means for removing moisture therefrom.

31. A method of moistening a copy sheet in a duplicating process comprising causing a copy sheet to pass adjacent to a moistening device, applying backing means to said sheet to press the sheet against the moistening device whereby one surface of said sheet is moistened, removing said backing means from said moistening device after said sheet has passed said moistening device, and conditioning said backing means after said removal for a subsequent operation.

32. In a duplicating process, a method of moistening a copy sheet which is passed between a moistening device and a backing roller which comprises urging said backing roller towards said moistening device at about the time when the leading edge of a copy sheet reaches the moistening device, maintaining the backing roller out of contact with the moistening device by the interposition of said copy sheet therebetween until the trailing edge of said copy sheet passes said moistening device, removing the backing roller from said moistening device, and conditioning said backing roller for a subsequent operation by removing moisture from the surface thereof.

33. In the moistening of copy sheets in a duplicating process by passing copy sheets between moistening means and backing means, the method of maintaining the surface of said backing means in a substantially dry condition comprising applying said backing means into pressure relationship with said moistening means for pressing the copy sheet against said moistening means, permitting said backing means to contact said moistening means after the trailing edge of said copy sheet has passed said moistening means, removing said backing means from said moistening means, and conditioning said backing means for a subsequent operation.

ALFRED MARCHEV.
ROBERT F. MORRISON.
MORRIS P. NEAL.